Figure 5:
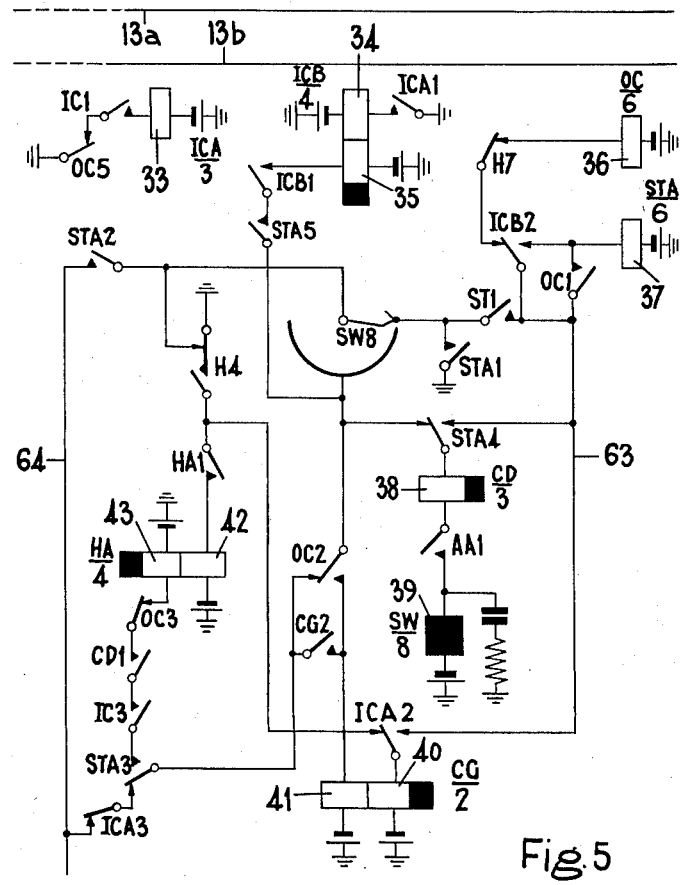

April 30, 1963 N. C. SMART 3,087,997
AUTOMATIC TELEPHONE SYSTEMS
Filed April 22, 1959 13 Sheets-Sheet 1
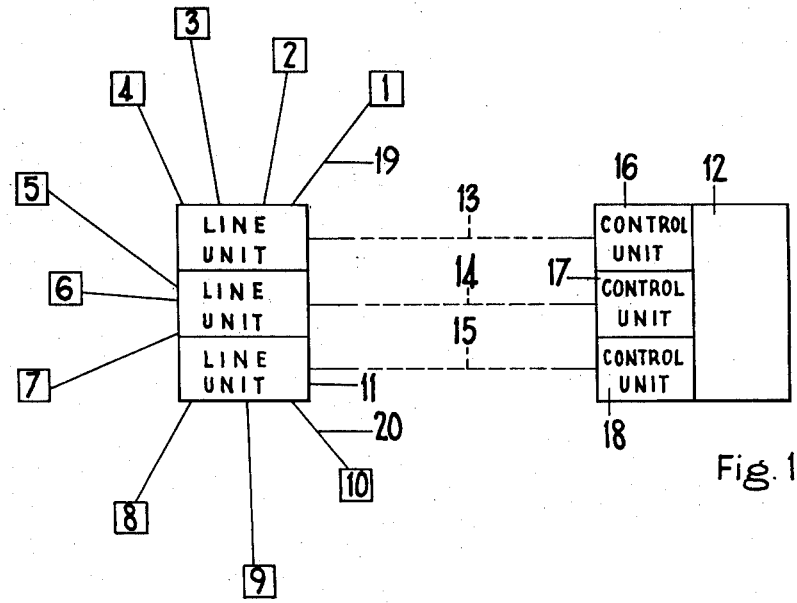
Fig. 1
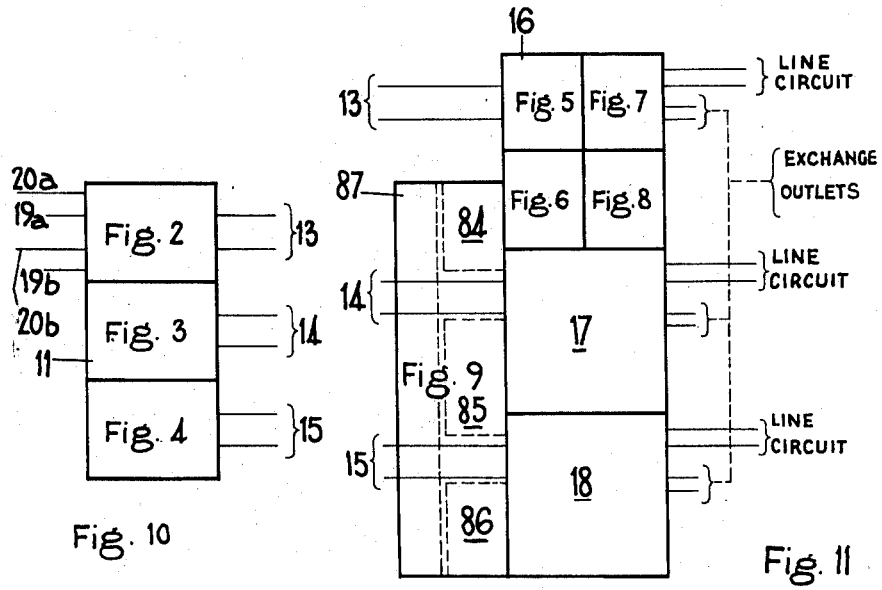
Fig. 10
Fig. 11
INVENTOR
NORMAN CAROL SMART
BY
ATTORNEYS

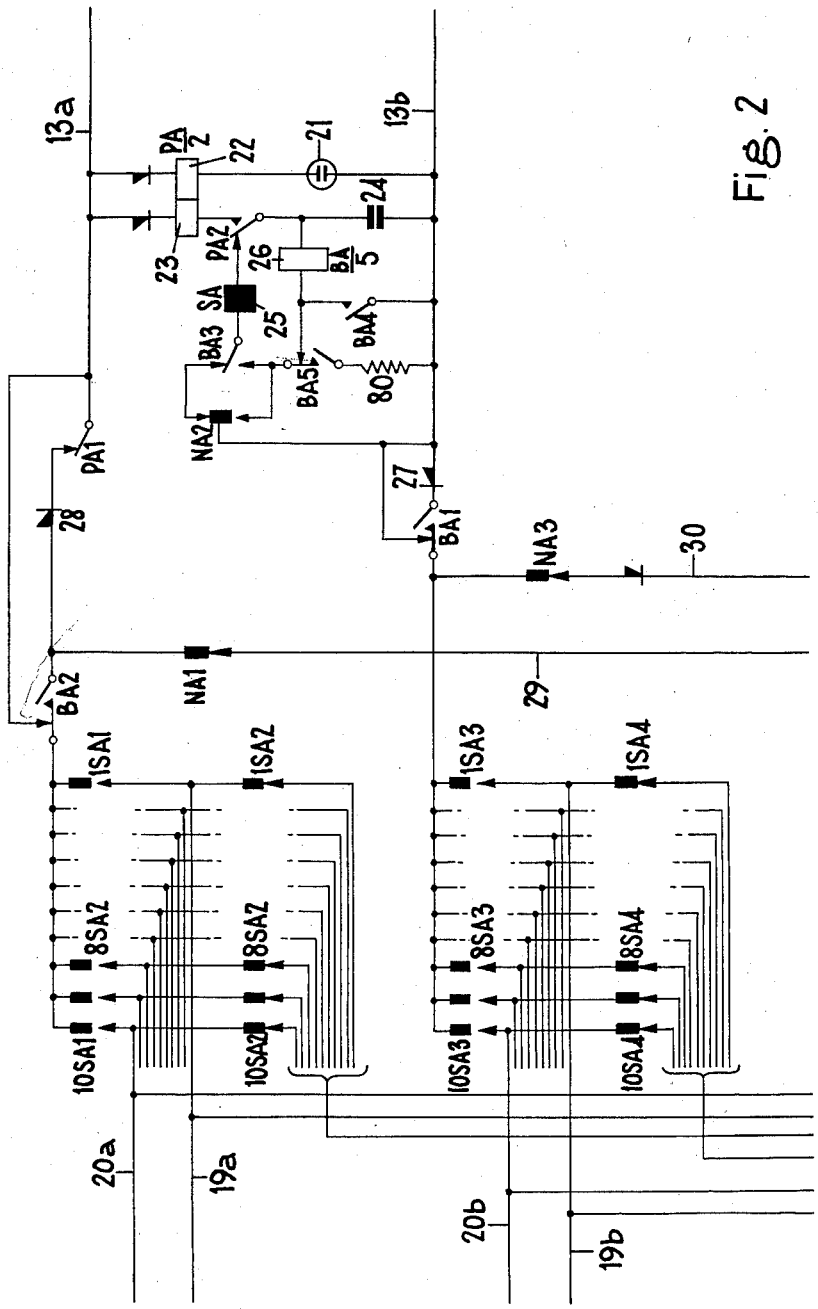

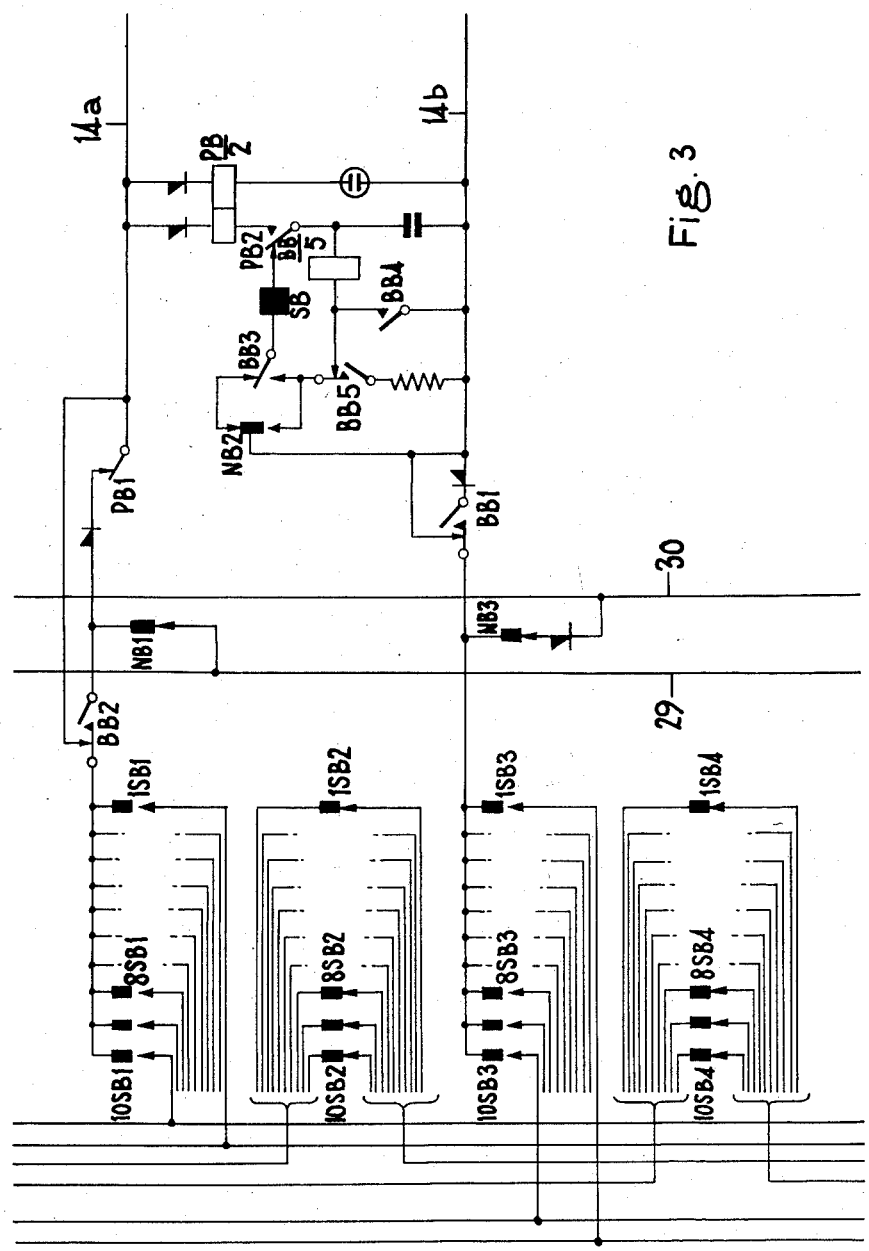

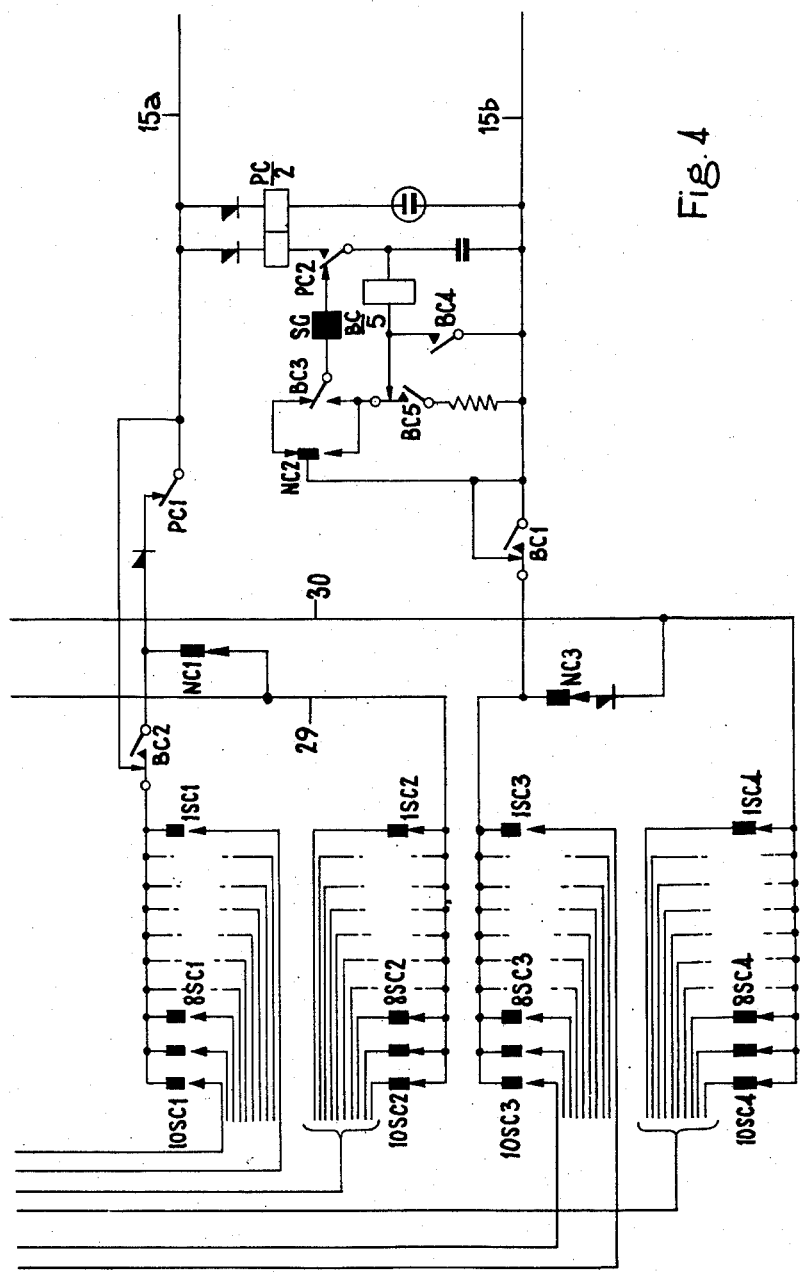

April 30, 1963 N. C. SMART 3,087,997
AUTOMATIC TELEPHONE SYSTEMS
Filed April 22, 1959 13 Sheets-Sheet 8

INVENTOR
NORMAN CAROL SMART
BY Kirschstein, Kirschstein & Ottinger
ATTORNEYS

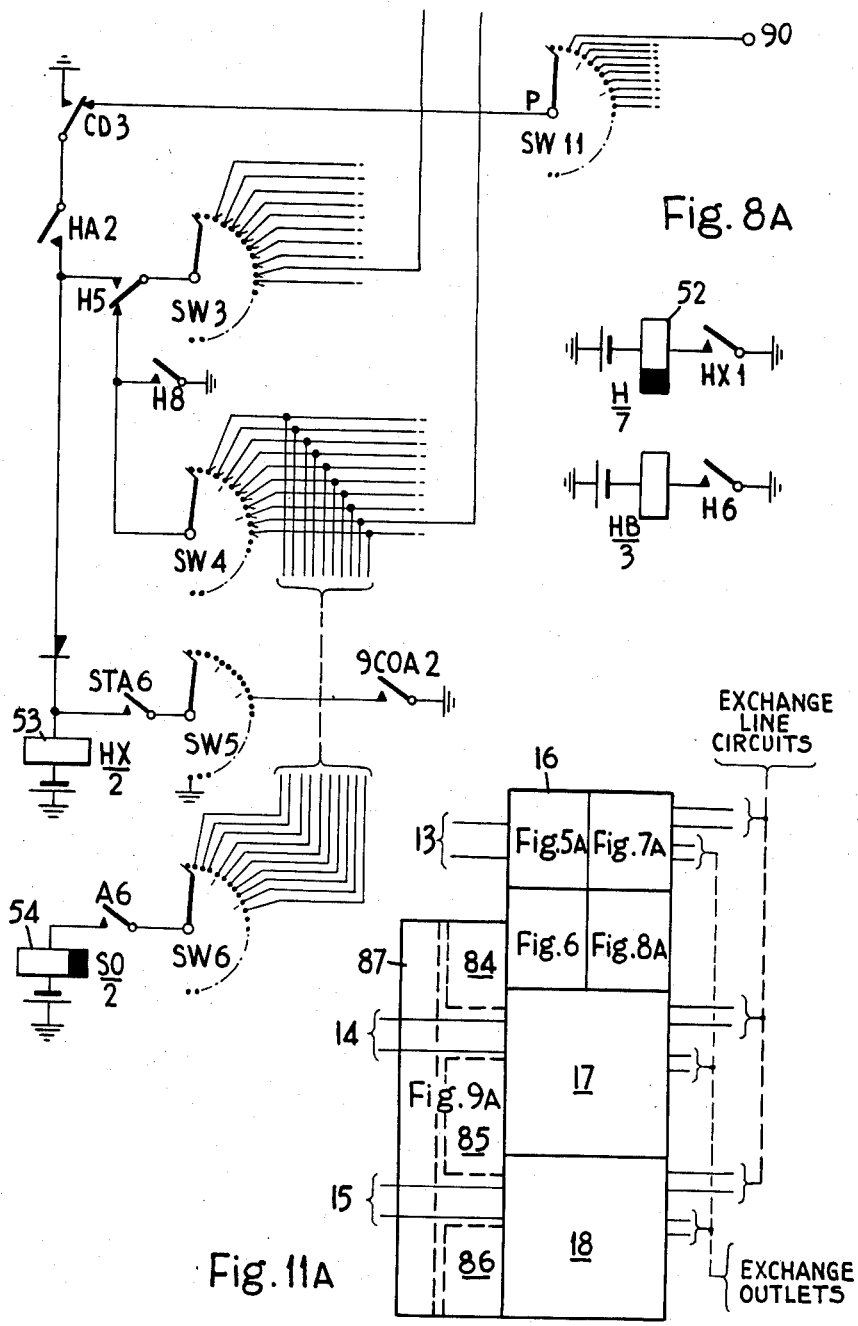

April 30, 1963  N. C. SMART  3,087,997
AUTOMATIC TELEPHONE SYSTEMS
Filed April 22, 1959  13 Sheets-Sheet 12

INVENTOR
NORMAN CAROL SMART
BY
ATTORNEYS

United States Patent Office 3,087,997
Patented Apr. 30, 1963

3,087,997
AUTOMATIC TELEPHONE SYSTEMS
Norman Carol Smart, Coventry, England, assignor to The General Electric Company Limited, London, England
Filed Apr. 22, 1959, Ser. No. 808,115
Claims priority, application Great Britain June 6, 1958
6 Claims. (Cl. 179—18)

This invention relates to automatic telephone systems of the kind in which each of a plurality of telephone stations served by an automatic telephone exchange receives its operating current exclusively from that telephone exchange.

It is an object of the present invention to provide an improved automatic telephone system of the kind specified.

According to the present invention, an automatic telephone system of the kind specified comprises at least one control unit to which are connected the exchange outlets associated with a plurality of telephone stations and which is connected to one or more line circuits of the exchange, and at least one line unit to which the plurality of telephone stations are individually connected and which is connected to the control unit or to an associated one of the control units by way of a telephone line individual thereto, the line unit or each of the line units, when not employed in connection with a call, providing connections between the associated telephone line and each of the telephone stations whereby a calling condition originated at any one of those stations is applied to that line and being arranged to interrupt all those connections and thereafter make those connections one at a time in response to electric impulses received from the associated control unit, the control unit, or one of the control units if there are more than one, being arranged to operate in response to a calling condition to supply electric impulses to the associated telephone line until either the calling condition is re-applied to that line due to the reconnection by the associated line unit of a calling telephone station or, if the calling condition is applied to one of the said exchange outlets, that telephone line is reconnected to the telephone station associated with that one of the exchange outlets, and thereafter to extend that line to either a line circuit of the exchange or, if the calling condition has been applied to one of the said exchange outlets, to that outlet, and the arrangement being such that only one of the telephone stations may be connected to the exchange over the telephone line or any one of the telephone lines at a time.

Preferably there are two or more of said control units and an equal number of said line units which are each connected to a different one of said control units by way of a separate telephone line.

In the present specification, the term "line circuit" means any non-numerical switching circuit whereby a telephone line may be extended to a first group selector of an automatic telephone exchange.

Preferably the line unit, or each of the line units if there are more than one, comprises an electrical circuit including an electromagnetic step-by-step switch having a separate set of contacts for each of the plurality of telephone stations, which contacts are arranged to be actuated sequentially upon the operation of the switch and so that all the contacts of the set associated with any one of the telephone stations are actuated at the same time.

The line unit, or each of the line units if there are more than one, may comprise an electrical circuit which is in accordance with at least claim 1 of British Patent No. 785,894. Thus the line unit, or each of the line units if there are more than one, comprises an electrical circuit having an electromagnetic step-by-step switch, capacitance and means responsive to the supply of electric impulses to the circuit to apply each impulse to the capacitance so that at least part of the electrical enregy of the impulse is stored by the capacitance, the said means being adapted to act upon the termination of each impulse so as to connect the capacitance in a closed circuit with an operating winding of the electromagnetic switch whereby the capacitance discharges through the operating winding to operate the said switch and the arrangement being such that the electrical power supplied to the operating winding upon the termination of any one of the impulses is greater than would have been the case if the impulse had been supplied directly to that operating winding.

The said means may be an electromagnetic relay having a winding connected between the line wires of the associated telephone line, there being contacts of the said relay which act when the relay is operated to connect the capacitance in a second circuit which is between the said line wires. The contacts of said relay may be arranged to connect the capacitance in a closed circuit with the operating winding of the electromagnetic switch when the relay is non-operated.

The said electromagnetic switch may have a predetermined home position where none of the said contacts are actuated and is provided with further contacts which are arranged to be actuated in all positions of the switch except that home position and which, in their non-actuated condition, provide connections between the associated telephone line all of the plurality of telephone stations whereby a calling condition originated at any one of those stations is applied to that telephone line.

The control unit or each of the control units may include an electrical impulse generating circuit which is in accordance with at least claim 1 of British Patent No. 746,069 and which is arranged to generate the electric impulses that are supplied to the associated telephone line upon the operation of the control unit. Such an impulse generating circuit comprises a first electromagnetic relay, the associated contacts of this relay acting during operation of the impulse generating circuit to control the supply of electric impulses to the associated telephone line, a second electromagnetic relay and a third electromagnetic relay, the arrangement being such that during operation of the impulse generating circuit the duration in time of each period for which the said first relay is operated is dependent upon the release time of the said second relay and the duration in time of each period for which the said first relay is non-operated is dependent upon the release time of the said third relay.

The release time of each of the said second and third relays may be adjustable by means of a variable resistance circuit connected in shunt with its operating winding. A part of each of the said variable resistance circuits may be common to both of the said relay operating windings.

The control unit or each of the control units may also include a uniselector switch which has a predetermined home position for its wipers and which is arranged to be operated under the control of the associated electrical impulse generating circuit so that the stepping of its wipers and the actuation of the sets of contacts by the switch in the associated line unit are substantially synchronised.

Preferably the control unit or each of the control units is arranged so that a connection set up between any one of the plurality of telephone stations and the telephone exchange in consequence of its operation as aforesaid in response to a calling condition is maintained in dependence upon the continuation of that condition. Thus the control unit or each of the control units may be arranged so that subsequent to its operation as aforesaid in response to a calling condition it acts upon the discontinuation of that condition to supply electric impulses to the associated telephone line so that the switch in the associated line unit is returned to its predetermined home position. Preferably it is arranged that the supply of these electric impulses to the telephone line or the appropriate one of the telephone lines is able to continue after the switch in the associated line unit has reached its home position and until the uniselector switch in the associated control unit has stepped its wipers to their predetermined home positions, the switch in the associated line unit being adapted so that it is unable to operate further after its home position is reached.

In a preferred arrangement there are provided two or more telephone lines each terminated at one end by a separate control unit and each terminated at the other end by a separate line unit, the control units being located at the automatic telephone exchange and the line units being located together at a large distance from the exchange but at relatively short distances from the plurality of telephone stations.

Each control unit may be arranged so that upon its operation in respose to a calling condition, it is unable either to terminate the supply of electric impulses to the associated line or to extend that line through to the exchange upon the reconnection of that line by the associated line unit to any one of the plurality of telephone stations which is already connected to the exchange by way of a different one of the telephone lines.

Figure 5A:
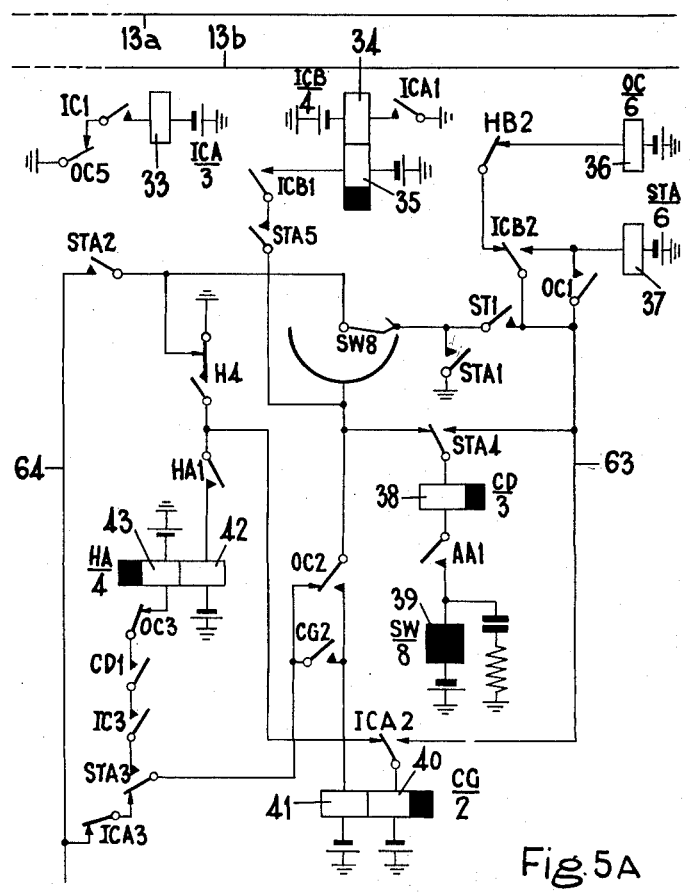
Figure 6:
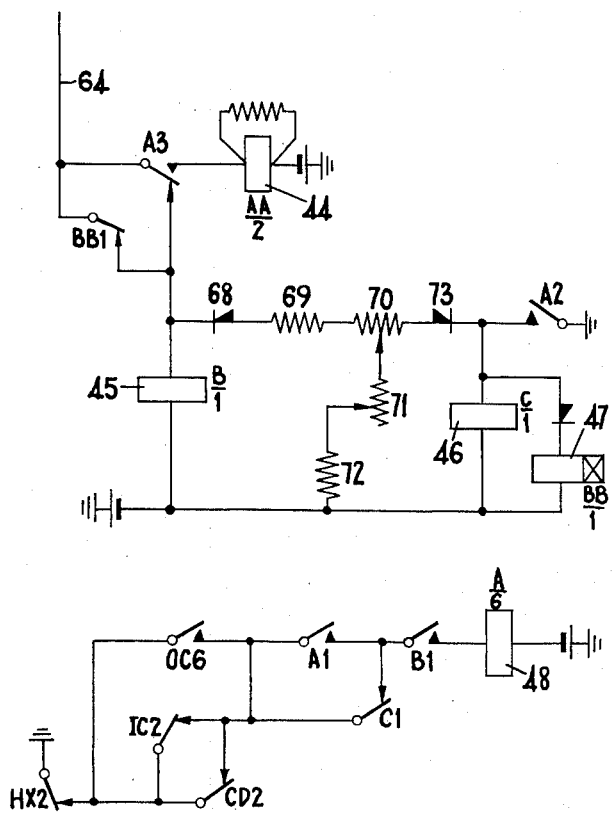
Figure 7:
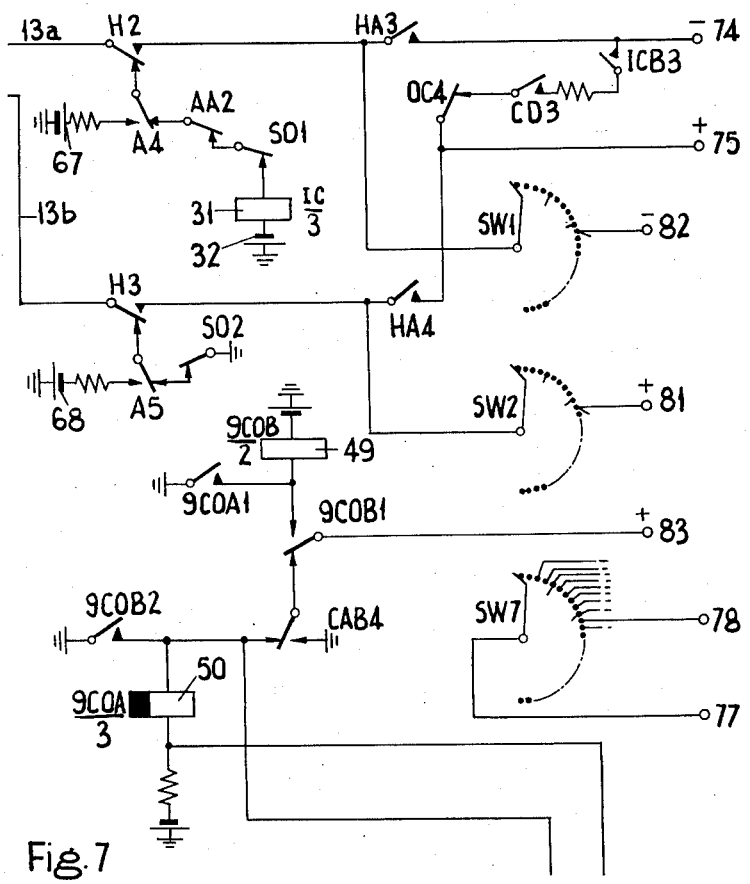
Figure 7A:
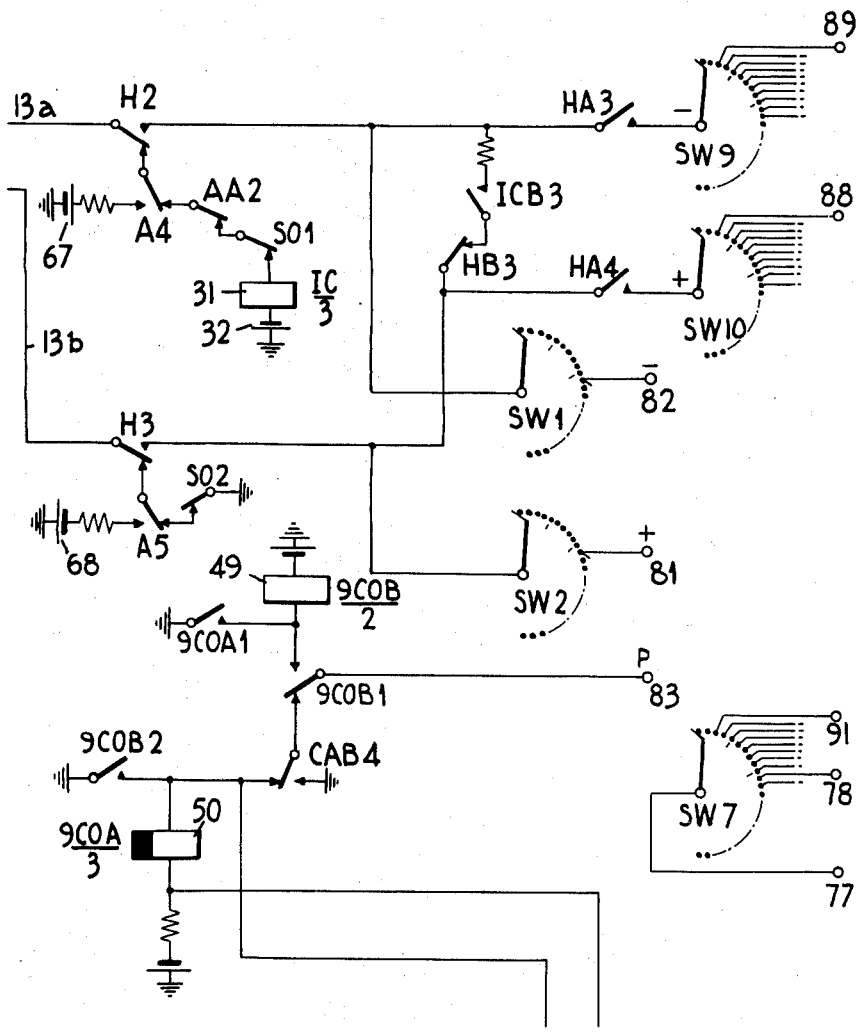
Figure 8:
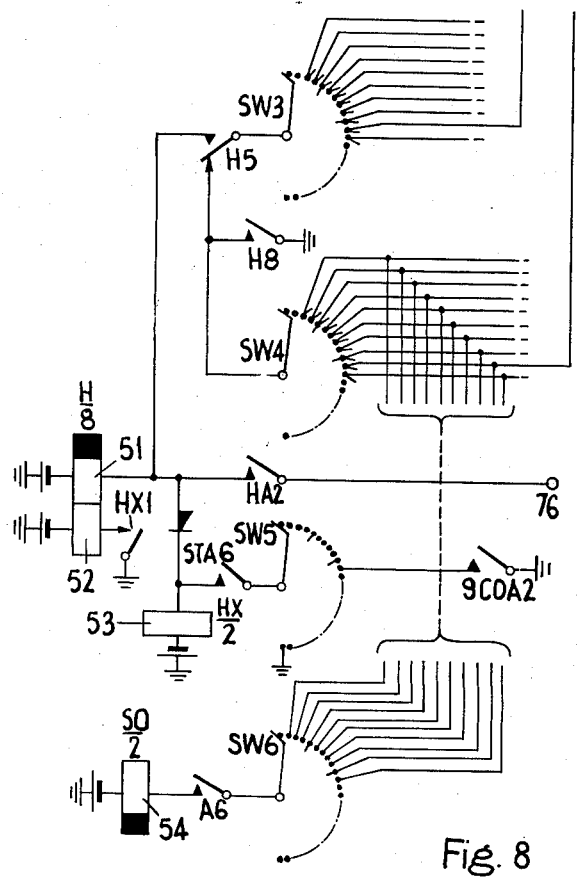
Figure 9:
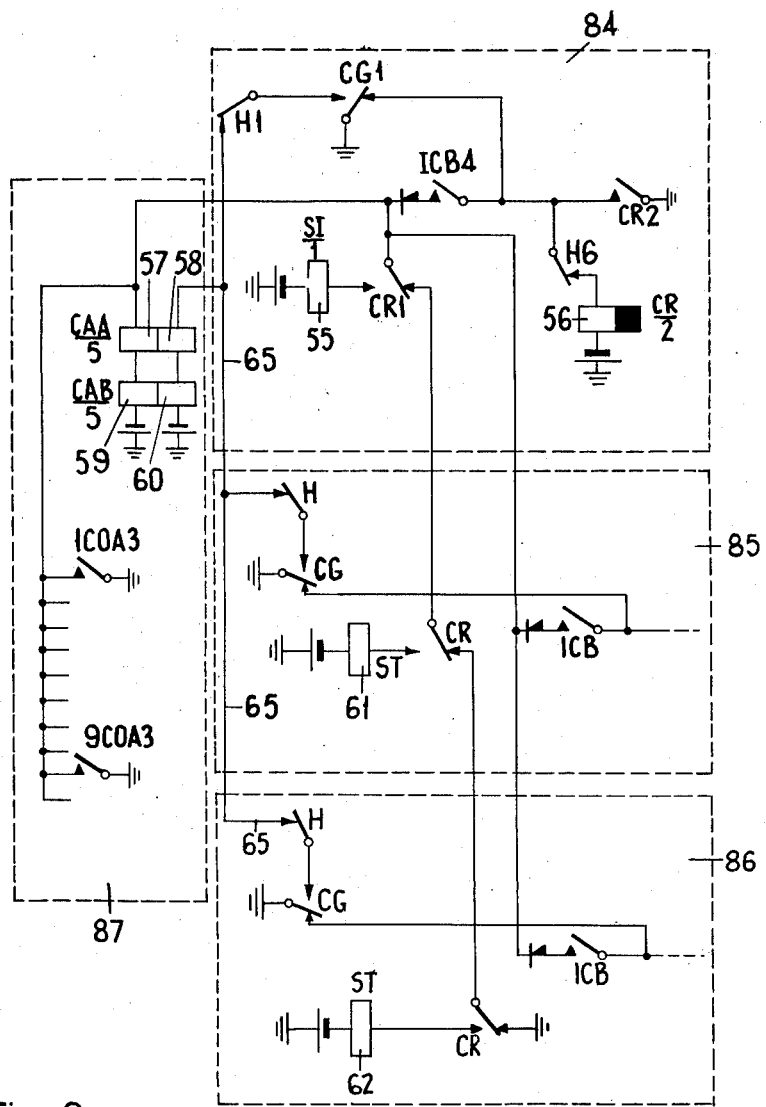
Figure 9A:
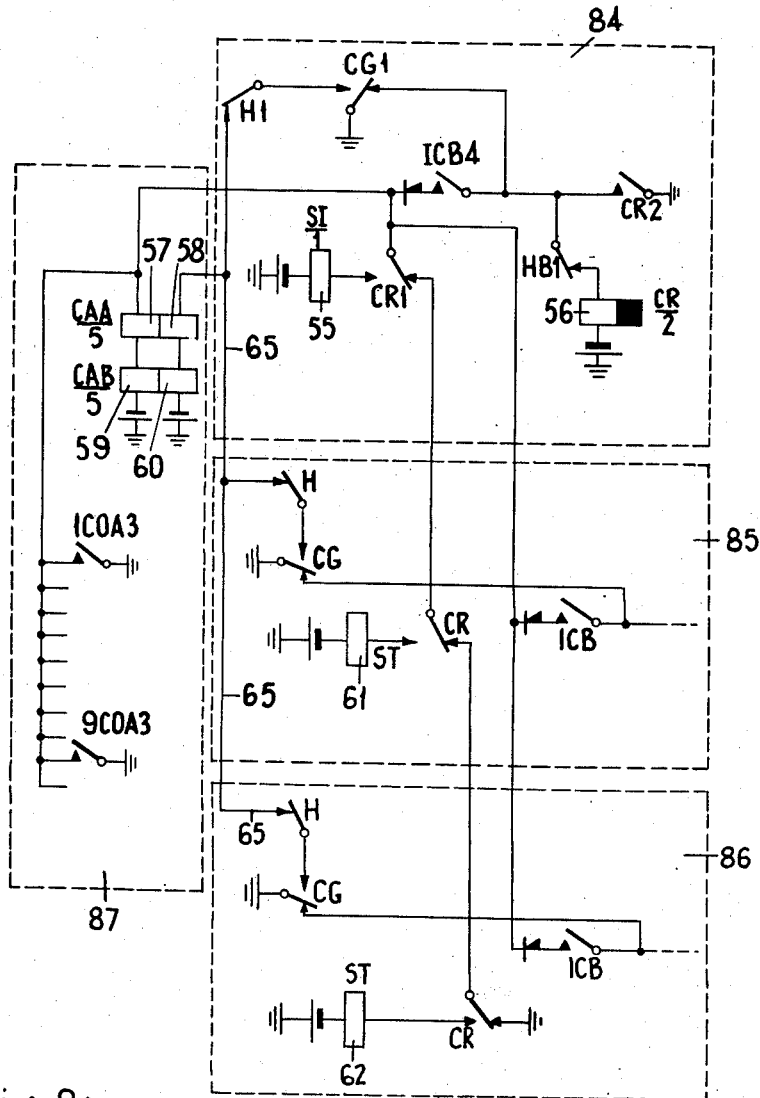

One embodiment of an automatic telephone system in accordance with the present invention will now be described by way of example with reference to the sixteen figures of the accompanying drawings in which FIGURE 1 shows the telephone system schematically;

FIGURES 2, 3 and 4 show the electrical circuits of three line units respectively;

FIGURES 5, 6, 7 and 8 together show the electrical circuit of part of a first type of control unit that may be employed in the system represented by FIGURE 1;

FIGURES 5A, 7A and 8A correspond to FIGURES 5, 7 and 8 respectively and together with FIGURE 6 show the electrical circuit of part of a second type of control unit that may be employed in the system represented by FIGURE 1;

FIGURE 9 shows the electrical circuit of guard equipment which is common to the three control units of FIGURE 1 when those control units are each of the said first type;

FIGURE 9A corresponds to FIGURE 9 and shows the electrical circuit of guard equipment which is common to the three control units of FIGURE 1 when those control units are each of the said second type;

FIGURE 10 shows how FIGURES 2, 3 and 4 should be arranged to show the electrical circuit of a subsidiary switching centre which is represented in block form in FIGURE 1;

FIGURE 11 shows how FIGURES 5, 6, 7, 8 and 9 should be arranged to show the electrical circuit of one control unit of the said first type and the relationship of FIGURE 9 to three such control units in the system represented by FIGURE 1; and FIGURE 11A shows how FIGURES 5A, 6, 7A, 8A and 9A should be arranged to show the electrical circuit of one control unit of the said second type and the relationship of FIGURE 9A to three such control units in the system represented by FIGURE 1.

The automatic telephone system shown schematically in FIGURE 1 comprises a central battery automatic telephone exchange 12 and a subsidiary switching centre 11 situated at a distance from the exchange. Ten telephone stations 1 to 10 which are served by the exchange 12 and which are situated at large distances from the exchange but at relatively short distances from the subsidiary switching centre 11 are connected to that centre over individual two-wire lines, such as the lines 19 and 20 associated with the stations 1 and 10. Three telephone lines 13, 14 and 15 provide the connections between the exchange 12 and the subsidiary switching centre 11 and all calls to and from the telephone stations 1 to 10 are set up over these telephone lines. Each of the telephone lines is accessible to all of the telephone stations and up to three calls to and from different ones of the telephone stations 1 to 10 may proceed simultaneously, each call utilising a different one of the telephone lines.

The subsidiary switching centre 11 comprises a separate line unit for each of the telephone lines 13, 14 and 15. The electrical circuits of the line units connected to the telephone lines 13, 14 and 15 are shown in FIGURES 2, 3 and 4 respectively while FIGURE 10 shows the manner in which these figures should be arranged to provide the complete electrical circuit of the subsidiary switching centre 11.

The telephone exchange 12 includes a separate control unit 16, 17 and 18 for each of the telephone lines 13, 14 and 15 respectively. Each of these control units 16, 17 and 18 is connected to the outlets in the final selector multiple (not shown) of the exchange 12 that correspond each to a different one of the telephone stations 1 to 10. The control units 16, 17 and 18 are also connected to line circuits of the exchange 12. Thus each of the control units may be connected to a different one of the exchange line circuits. The electrical circuit of a first type of control unit that is suited to such an arrangement is shown in FIGURES 5, 6, 7, 8 and 9 which should be arranged in the manner shown in FIGURE 11. Alternatively, each of the telephone stations 1 to 10 may be associated with a different one of ten line circuits of the telephone exchange 12 all of which line circuits are connected to each of the control units 16, 17 and 18. With this second alternative, each control unit must be adapted for the selection of any particular one of the ten line circuits. The electrical circuit of a second type of control unit that is so adapted is shown in FIGURES 5A, 6, 7A, 8A and 9A which should be arranged in the manner shown in FIGURE 11A. In any particular arrangement the control units 16, 17 and 18 are all of the same type and differ from one another only in respect of the portions 84, 85 and 86 which are shown in FIGURES 9 and 9A and which, as will be hereinafter described, determine the order in which the telephone lines 13, 14 and 15 are available for use in connection with telephone calls.

The manner of operation of the automatic telephone system is briefly as follows. Upon a subscriber at one of the telephone stations 1 to 10, such as the station 1, lifting his handset to make a call, his cradle switch contacts (not shown) act in well known manner to connect a loop, the calling loop, across the associated two-wire line 19. At the subsidiary switching centre 11, this calling loop is applied to all of the telephone lines 13, 14 and 15 that are not then engaged in connection with calls. The control units 16, 17 and 18 have a predetermined order of availability, the control unit 16 being of highest order and the control unit 18 being of lowest order. If, then, the calling loop is applied to all the telephone lines 13, 14 and 15, the control unit 16 responds and in so doing, prevents the response of the control units 17 and 18 to the calling loop. In consequence of the response of the control unit 16, earth potential is applied to the outlets in the exchange final selector multiple that each correspond to a different one of the telephone stations 1 to 10, and the control unit 16 causes electric impulses to be supplied to the telephone line 13. The earth potential applied to the said outlets prevents any one of the telephone stations 1 to 10 from receiving a call from the exchange 12.

The line unit connected to the line 13, like the other two line units, includes an electromagnetic step-by-step switch SA. This switch SA has a home position and is arranged to take one step away from the home position in response to each electric impulse received over the telephone line 13 during the setting up of a connection to the exchange 12. In stepping from its home position, the switch SA is arranged to disconnect all the individual two wire lines 19, 20 and the like from the telephone line 13 and to thereafter reconnect those two-wire lines in sequence, one at each step until a calling loop is detected. This need not necessarily be the original calling loop but may be due to another one of the telephone stations 1 to 10 which is selected at an earlier position of the switch than the original calling telephone station. However such a condition cannot arise in the case under consideration as the telephone station 1 is the first to be selected by the switch.

Upon the reconnection of the calling loop to the telephone line 13, the control unit acts to discontinue the supply of electric impulses and to thereafter extend that telephone line through to a first group selector (not shown) of the exchange 12. If the control units 16, 17 and 18 are each of the said first type, this first group selector is engaged over the line circuit (not shown) associated with control unit 16 during the time interval required to select the calling telephone station 1. The calling loop having been extended through, dial tone is returned to the calling subscriber who thereupon dials the digits of the wanted subscriber's number and thus causes the desired connection to be set up through the telephone exchange 12 in well known manner. The switching through of the calling loop to the exchange switching apparatus is followed by the removal of the earth potential from all the said outlets in the final selector multiple excepting the outlet associated with the telephone station 1 so that calls may again be extended from those outlets to the appropriate ones of the telephone stations 2 to 10.

In the event of a calling loop being now applied to the particular one of the said exchange outlets which is associated with the telephone station 10 say, the control unit 17 responds as it is now the available control unit of highest order. In responding, the control unit 17 acts to prevent the response of the control unit 18 to which the calling loop is also applied. It also acts to apply earth potential to all of the said outlets and to supply a number of electric impulses to the telephone line 14 which number is characteristic of the outlet having the calling condition applied and is such as to bring about the selection of the telephone station 10 by the switch in the line unit connected to the telephone line 14. The telephone station 10 having been selected, the exchange 12 supplies ringing current over the telephone line 14 to ring the wanted subscriber's bell. This supply of ringing current is tripped upon the wanted subscriber at the station 10 lifting his handset to answer the call. The earth potential is removed from each of the outlets associated with the telephone stations 2 to 9 upon the calling loop applied to the outlet associated with the station 10 being extended through to that telephone station.

In order that the automatic telephone system may be described in more detail, reference should be made to FIGURES 2 to 4 which should be arranged in the manner shown in FIGURE 10 and to FIGURES 5, 6, 7, 8 and 9 which should be arranged in the manner shown in FIGURE 11.

Each of the line units (FIGURES 2, 3 and 4) is substantially identical so that only the line unit which is connected to the telephone line 13 and which is shown in FIGURE 2 will be described. This line unit has an electromagnetic step-by-step switch SA which is for operating sets of contacts that are each particular to a different one of the telephone stations 1 to 10. The contacts of each set are prefixed by the same reference numeral as their associated telephone station. The switch SA also has off-normal contacts NA1, NA2 and NA3 which are actuated in all positions of the switch except its home position. All of the said contacts are actuated by means of cams (not shown) that are carried by a shaft which is arranged to be rotated step-by-step by the mechanism of the switch SA, there being one cam individual to the off-normal contacts NA1 to NA3 and a separate cam for each set of contacts 1SA1 to 1SA4 and the like. The sets of contacts 1SA1 to 1SA4 and the like are actuated in sequence by the switch SA, one set at a time. The sequence is such that the sets of contacts are actuated in the numerical order of the associated telephone stations, the set of contacts 1SA1 to 1SA4 being first in the sequence and the set of contacts 10SA1 to 10SA4 being last in the sequence.

The electrical circuit of the switch SA is substantially as described in the specification of British Patent No. 785,894. Thus an electric impulse received over the line wires 13a and 13b of the telephone line 13 strikes gas tube 21 and energises high resistance winding 22 of relay PA which operates. Contacts PA1 thereupon open but have no function at this stage, and contacts PA2 switch to connect low resistance winding 23 of the relay PA in series with a capacitor 24 of large value. This capacitor 24 is thus charged for the remainder of the pulse whereafter, upon the release of the relay PA, it is connected by the contacts PA2 in a discharge circuit which includes winding 25 of the switch SA, contacts BA3 and the off-normal contacts NA2. The winding 25 is thus energised and the switch SA rotates its cam carrying shaft (not shown) one step so that the off-normal contacts NA1 to NA3 are actuated.

The next impulse received over the telephone line 13 results in a repetition of the operations described above. In addition, the winding 26 of relay BA is energised over the actuated contacts NA2 upon the contacts PA2 switching so that the relay BA operates and thereafter remains operated during the supply of electric impulses over the telephone line 13. Upon the relay BA operating, its contacts BA1 and BA2 close so that between impulses there exist connections between the line wires 13b and 13a and the individual line wires of the then selected telephone stations 1 to 10. These connections are made by way of rectifiers 27 and 28 which are connected so as to be non-conductive to the electric impulses received over the telephone line 13 but so as to be conductive to the electric current which flows over that line upon the application thereto of a calling loop. Contacts BA3 switch to provide a discharge circuit for thes capacitor 24 by way of the actuated off-normal contacts NA2. Contacts BA4 complete a circuit to hold the relay BA operated between impulses and for a short interval after the end of impulsing and contacts BA5 have no function at this stage. The set of contacts 1SA1 to 1SA4 are actuated upon the second step of the switch SA and the other sets are arranged to be actuated one at each succeeding step.

When none of the telephone lines 13, 14 and 15 is in use, the cam carrying shafts of the switches SA, SB and SC in the line units are in their home position and the off-normal contacts NA1 to NA3, NB1 to NB3 and NC1 to NC3 are non-actuated. Each of the telephone stations 1 to 10 is then connected to all three of the telephone lines 13, 14 and 15. For example, off-normal contacts NA1, NB1 and NC1 provide connections between the line wires 13a, 14a and 15a respectively and lead 29. Similarly off-normal contacts NA3, NB3 and NC3 provide connections between the line wires 13b, 14b and 15b respectively and lead 30. The lead 29 is connected by way of the contacts 1SC2 to 10SC2, 1SB2 to 10SB2 and 1SA2 to 10SA2 to each of the line wires 19a, 20a and the like of the individual two-wire lines to the telephone stations 1 to 10. The lead 30 is connected by way of the contacts 1SC4 to 10SC4, 1SB4 to 10SB4 and 1SA4 to 10SA4 to each of the line wires 19b, 20b and the like of the individual two-wire lines to the telephone stations 1 to 10. A calling loop applied to any one of the two-wire lines 19, 20 and the like is therefore applied to all three of the telephone lines 13, 14 and 15 or as many of those lines as are not engaged in connection with calls.

The control unit 16 (FIGURES 5 to 9), like each of the control units 17 and 18, is of the said first type and includes a uniselector switch SW. The wipers SW1 to SW8 of this switch have a home position (as shown) in which they are in engagement with the first contacts of their associated banks. The third to twelfth contacts of the bank associated with the wiper SW1 are each connected to both the corresponding contacts of the equivalent banks in the control units 17 and 18 and to the negative terminal of a different one of the exchange outlets that are associated with the telephone stations 1 to 10. Similarly, the third to twelfth contacts of the bank associated with the wiper SW2 are each connected both to the corresponding contacts of the equivalent banks in the control units 17 and 18 and to the positive terminal of a different one of the exchange outlets associated with the telephone stations 1 to 10 respectively. The P wire terminal of each said outlet is associated with a separate pair of relays, such as the relays 9COA and 9COB of the outlet which is associated with the telephone station 9 and which has a positive terminal 81, a negative terminal 82 and a P wire terminal 83. The control unit 16 also has terminals 74, 75 and 76 which are connected to the negative, positive and P wire respectively of an associated line circuit (not shown) in the telephone exchange 12, there being a separate line circuit for each control unit 16, 17 and 18. In addition, terminal 77 is connected to a lead in the exchange 12 which is common to all the meters of the telephone stations 1 to 10 and terminal 78 is connected to the meter of the telephone station 9.

The third to twelfth contacts of the banks associated with the wipers SW3 to SW5 and SW7 are also associated with the telephone stations 1 to 10 respectively. For reasons to be hereinafter described, the second to eleventh contacts of the bank associated with the wiper SW6 are individually connected to the third to twelfth contacts respectively of the bank associated with the wiper SW4. The second and succeeding contacts of the bank associated with the wiper SW8 are connected together.

Let it be assumed that a calling loop is originated at one of the telephone stations 1 to 10 when none of the telephone lines 13, 14 and 15 are in use. This calling loop is extended over each of the telephone lines 13, 14 and 15 to the control units 16, 17 and 18 respectively. The relay CR (FIGURE 9) and the corresponding relays (not shown) in the portions 85 and 86 of the guard equipment that are associated with the control units 17 and 18 are all operated and their contacts CR1, CR2, CR and CR are actuated.

In the control unit 16 (FIGURES 5 to 9), the relay IC operates in response to the calling loop. Thus current flows from battery 32 through winding 31 and over contacts SO1, AA2, A4, H2, the calling loop and contacts H3, A5 and SO2. Contacts IC1 close to complete an energising circuit for the winding 33 of relay ICA. Contacts IC2 and IC3 have no function at this stage.

Upon the relay ICA operating, its contacts ICA1 complete a circuit to energise the winding 34 of relay ICB. Contacts ICA2 and ICA3 have no function at this stage.

Upon the relay ICB operating, its contacts ICB1, ICB2 and ICB3 have no function at this stage. Contacts ICB4 (FIGURE 9) complete a circuit to energise the winding 55 of relay ST and also the windings 57 and 59 of common guard relays CAA and CAB (FIGURE 9).

Upon the relays CAA and CAB operating, their contacts act to connect earth potential to the P wire terminal of each of the outlets in the final selector multiple (not shown) of the telephone exchange 12 that are associated with the telephone stations 1 to 10. For example, the contacts CAB4 (FIGURE 7) connect their associated earth to the P wire terminal 83 of the outlet associated with the telephone station 9.

Although the relays in the control units 17 and 18 that correspond to the relays IC, ICA and ICB are also operated at this stage, the relays ST in the portions 85 and 86 of the guard equipment (FIGURE 9) are unable to operate as the contacts CR1 in the portion 84 are actuated.

Upon the relay ST (FIGURE 9) in the control unit 16 operating, its contacts ST1 complete a circuit between earth potential on contacts H4 and lead 63 by way of wiper SW8 of uniselector switch SW and the home contact of the associated contact bank. The windings 37 and 40 of relays STA and CG are therefore energised.

Upon the relay STA operating, its contacts STA1 complete a holding circuit for the relays STA and CG. Contacts STA2 complete a circuit between earth on the contacts H4 and the start lead 64 of an electric impulse generator (FIGURE 6). Contacts STA3, STA4, STA5 and STA6 have no function at this stage.

Upon the relay CG operating, its contacts CG1 connect their associated earth to a lead 65 (FIGURE 9) so that the windings 58 and 60 of the common guard relays CAA AND CAB (FIGURE 12) are energised to hold these relays operated. Contacts CG2 have no function at this stage.

The electric impulse generator shown in FIGURE 6 is substantially as described in the specification of British Patent No. 746,069. Thus, relay B operates as its winding 45 is energised upon the application of earth potential to the start lead 64. Its contacts B1 close to complete an energising circuit for winding 48 of relay A which operates. Contacts A1 shunt contacts C1 so that the relay A holds operated upon the subsequent operation of relay C. Contacts A2 close to complete circuits whereby winding 46 of relay C and winding 47 of slow-operate relay BB are energised. Contacts A3 switch to complete a circuit whereby winding 44 of relay AA is energised. Contacts A4 switch to connect the positive terminal of 50 volt exchange battery 67 to the line-wire 13a of the telephone line 13 and to disconnect the winding 31 of the relay IC from that line-wire. Contacts A5 switch to connect the negative terminal of 50 volt exchange battery 68 to the line-wire 13b of the telephone line 13, and contacts A6 connect winding 54 of relay SO to wiper SW6 of the uniselector switch SW.

Upon the relay C operating, its contacts C1 have no function at this stage.

Upon the relay AA operating, its contacts AA1 complete a circuit whereby winding 38 of slow-release relay CD and winding 39 of the uniselector switch SW are energised. Contacts AA2 open to further disconnect the winding 31 of the relay IC from the line-wire 13a.

Upon the relay BB operating, its contacts BB1 open to disconnect the energising circuit of the relay B. Owing to the shunt circuit across the winding 45 provided by rectifier 68 and resistors 69, 70, 71 and 72, the release of the relay B is delayed. The duration of this delay is determined by the settings of the resistors 70 and 71.

Upon the release of the relay B, the contacts B1 open so that the relay A releases and at the contacts A2 disconnects the energising circuits of the relays C and BB. Rectifier 73 and the resistors 70, 71 and 72 provide a shunt circuit acros the windings 46 and 47 so that the release of the relay C is delayed for a predetermined interval. The relay BB holds operated during the generation of electric impulses and also for some time thereafter. The contacts A3 disconnect the energising circuit for the relay AA which releases and reconnect the energising circuit for the relay B which reoperates. The contacts A4 and A5 disconnect the exchange batteries 67 and 68 from the telephone line 13 and so terminate the first impulse supplied to that line. The contacts A1 and A6 have no function at this stage.

Upon the relay AA releasing, the contacts AA1 disconnect the energising circuit for the windings 38 and 39. The relay CD holds operated throughout the generation of electric impulses. The uniselector switch SW steps its wipers SW1 to SW8 to the second contacts in their respective banks whereupon the wiper SW8 completes a circuit for energising windings 35 and 41 of the relays ICB and CG. The contacts AA2 close but the relay IC does not reoperate since the calling loop has been disconnected by the off-normal contacts NA1 and NA3 (FIGURE 2) which have been actuated by the switch SA at the distant end of the telephone line 13 in response to the first electric impulse.

The electric impulse generator commences another cycle of operations, as described above, upon the relay A reoperating as the result of the release of the relays B and C. This, and any subsequent cycles each result both in the supply of a single 100 volt impulse to the telephone line 13 and in the stepping of the wipers SW1 to SW8 to the next contact in their respective banks. During each cycle, the duration in time of the period for which the relay A is operated and hence the duration of the electric impulse supplied to the telephone line 13, is dependent upon the release time of the relay B. The interval between impulses corresponds to the duration in time of the period for which the relay A is non-operated which period is dependent upon the release time of the relay C. It is arranged that the switch SA in the line unit (FIGURE 2) and the uniselector switch SW step substantially together.

Upon the operation of the relay CD that resulted from the initial operation of the relay AA, the contacts CD1 and CD2 had no function. The contacts CD3 closed to connect a loop across terminals 74 and 75 which, with terminals 76, 77 and 78, are connected to a conventional subscriber's uniselector circuit of the telephone exchange 12. The subscriber's uniselector circuit acts in known manner in response to the loop to obtain access to an available first group selector of the telephone exchange 12.

Upon the release of the relay IC that resulted from the initial operation of the relay A, the contacts ICI opened to cause the release of the relay ICA. The contacts IC2 and IC3 had no function.

Upon the release of the relay ICA, the contacts ICA1 disconnected the energising circuit for the winding 34. The slow-release relay ICB did not release however, as its other winding 35 was energised by way of the wiper SW8 upon that wiper being stepped to the second contact in the associated bank by the uniselector switch SW. The contacts ICA2 disconnected the energising circuit for the winding 40, but the relay CG held operated during the time taken for the switch SW to step its wipers to their second contacts whereafter the other winding 41 of that relay was energised by way of the wiper SW8. The contacts ICA3 had no function.

In consequence of the second impulse supplied to the telephone line 13, the switch SA in the line unit (FIGURE 2) closes the contacts 1SA1 and 1SA3 and so reconnects the line-wires 19a and 19b of the telephone station 1 to the line-wires 13a and 13b. Assuming the calling subscriber to be at that telephone station 1, then the calling loop is re-applied to the telephone line 13. At this time, the relay AA has released to disconnect the energising circuit of the winding 38 of the relay CD and the winding 39 of the switch SW, and the wipers SW1 to SW8 have stepped to the third contacts in their banks.

Owing to the re-connection of the calling loop the relay IC operates. The contacts ICI thereupon close so that the relay ICA reoperates. The contacts IC2 open to prevent the reoperation of the relay A and the contacts IC3 close to complete a circuit from the earth on the contacts H4 by way of the wiper SW8, its associated contact bank and the contacts OC2, STA3, CD1 and OC3 to energise winding 43 of relay HA.

Upon the relay ICA reoperating, the contacts ICA1 reconnect the energising circuit of the winding 34 of the relay ICB and the contacts ICA2 reconnect the energising circuit of the winding 40 of the relay CG. The contacts ICA3 have no function at this stage.

Upon the relay HA operating, its contacts HA2 complete circuits to energise windings 53 and 51 of relays HX and H from earth potential which is then applied to the terminal 76 by the associated subscriber's uniselector circuit (not shown). Contacts HA3 and HA4 close to enable the telephone line 13 to be extended through to the engaged subscriber's uniselector circuit upon the subsequent operation of the relay H. Contacts HA1 have no function at this stage.

Upon the relay HX operating, its contacts HX1 complete a holding circuit to energise winding 52 of the relay H and contacts HX2 prevent the operation of the relay A upon the subsequent release of the relay IC.

Upon the relay H operating, its contacts H1 disconnect the energising circuit for the windings 58 and 60 of the relays CAA and CAB. Contacts H2 and H3 extend the telephone line 13 through to the terminals 74 and 75 and hence to the then engaged first group selector of the exchange which causes dial tone to be supplied to the calling telephone station 1. These contacts H2 and H3 also disconnect the energising circuit of the relay IC. Contacts H4 complete a circuit to energise winding 42 of the relay HA and disconnect their associated earth both from the wiper SW8 so that windings 35, 41 and 43 of the relays ICB, CG and HA respectively are de-energised and from the lead 64 so that the relay B releases. Contacts H5 complete a circuit from the earthed terminal 76 over the contacts HA2 and the wiper SW3 to the contacts CAA1 (not shown), and to one side of the winding of relay ICOA (not shown). Earth potential is also applied to the other side of this winding by way of contacts H8 so that the relay ICOA does not operate. Contacts H6 disconnect the energising circuit of the slow-release relay CR and contacts H7 have no function at this stage.

The release time of the relay CD is arranged so that this relay releases after the relay H operates. The contacts CD3 therefore open to disconnect the associated loop from the terminals 74 and 75 after the calling loop has been extended through. The contacts CD1 and CD2 have no function at this stage.

Upon the relay IC releasing, its contacts ICI disconnect the energizing circuit of the relay ICA. The contacts IC2 and IC3 have no function at this stage.

Upon the release of the relay ICA, its contacts ICA1 disconnect the energising circuit of the winding 34 so that the relay ICB commences to release. The contacts ICA2 complete a holding circuit for the winding 40 of the relay CG, and the contacts ICA3 have no function at this stage.

Upon the relay ICB releasing, its contacts ICB2 disconnect the energising circuit of the winding 37 so that the relay STA releases. The contacts ICB4 disconnect the energising circuit of the windings 55, 57 and 59 so that the relays ST, CAA and CAB release, and the contacts ICB1 and ICB3 have no function at this stage.

Upon the relay CR releasing, its contacts CR1 switch to put the relays CAA and CAB under the control of the control units 17 and 18 and the contacts CR2 open to prevent the relay CR reoperating upon the release of the relay H.

Upon the relays CAA and CAB releasing, the contacts CAA1 (not shown) switch to extend the connection from the earthed terminal 76 to the P wire terminal (not shown) of the particular exchange outlet that is associated with the telephone station 1. The remaining contacts CAA2 to CAA5 and CAB1 to CAB5 switch to disconnect earth potential from the exchange outlets associated with the telephone stations 2 to 10.

Upon the relay ST releasing, its contacts ST1 have no function at this stage. Upon the release of the relay STA, its contacts STA1 to STA6 have no function at this stage.

The individual two-wire line 19 of the telephone station 1 has thus been extended over the telephone line 13 and through the control unit 16 to an available first group selector (not shown) in the telephone exchange 12. During the setting up of this connection to the exchange, 12, all the said outlets in the final selector multiple have been busied to prevent intrusion from the exchange whereafter the earth potential employed for this purpose has been removed from all of those outlets except the particular one associated with the calling telephone station 1.

A calling loop originated by any one of the telephone stations 2 to 10 may be applied to the telephone lines 14 and 15 during the setting up of the above connection. Such a calling loop results in the operation of the relays IC, ICA and ICB in the control units 17 and 18. However, until the connection has been set up from the telephone station 1 and the relay CR in the control unit 16 has released, neither of the control units 17 and 18 is able to function further.

During the continuation of the call over the telephone line 13, the relays HX and H are held operated due to the presence of earth potential on the terminal 76. The relays HA and CG are also held operated at this time. Upon the termination of the call, the earth potential on the terminal 76 is disconnected due to the release of the selector switches (not shown) in the telephone exchange 12 that occurs when the calling subscriber at the telephone station 1 replaces his handset and breaks the calling loop. The relay HX therefore releases and its contacts HX1 disconnect the holding circuit of the relay H which also releases. The contacts HX2 close to enable the relay A to operate upon the subsequent operation of the relay B.

By its release, the relay H acts at the contacts H1 to energise the windings 58 and 60 so that the relays CAA and CAB operate to apply earth potential to all the outlets associated with the telephone stations 1 to 10. The contacts H4 disconnect the energising circuit of the relay HA and connect their associated earth to the wiper SW8. The winding 41 of the relay CG is therefore energised as also is the winding 45 of the relay B. The contacts H2, H3, H5, H6, H7 and H8 have no function at this stage. The relay HA releases but its contacts HA1 to HA4 have no function at this stage.

The operation of the relay B recommences the operating cycle of the impulse generator (FIGURE 6) which acts in the manner previously described to supply 100 volt impulses to the telephone line 13 and to bring about the stepping of the wipers SW1 to SW8. The switch SA thus operates to actuate its sets of contacts in accordance with the predetermined sequence.

As the result of the tenth electric impulse supplied to the telephone line 13, the switch SA is stepped to a home position and the off-normal contacts NA1 to NA3 restore. At this time, the wipers SW1 to SW8 are positioned on the thirteenth contacts in their respective banks but this is of no consequence. Owing to the off-normal contact NA2 restoring, the switch SA does not operate in response to the electric impulses subsequently supplied to the telephone line 13. This is because a resistor 80 is now connected in series with the winding 25 which therefore receives insufficient power upon the discharge of the capacitor 24 to operate the switch SA. Consequently although the uniselector switch continues to step its wipers SW1 to SW8, the switch SA in the line unit remains in its home position. Eventually the wipers SW1 to SW8 are positioned once more on the first contacts in their respective banks (as shown) whereupon the connection between the earth potential associated with the contacts H4 and the start lead 64 of the impulse generator is interrupted at the wiper SW8. The relay B releases to prevent re-operation of the relay A and both the supply of electric impulses to the telephone line 13 and the stepping of the wipers SW1 to SW8 are terminated. The disconnection of earth potential from the start lead 64 also results in the release of the relay CG which acts at the contacts CG1 to cause both the release of the relays CAA and CAB and the re-operation of the relay CR, and so permits the control unit 16 to be taken into use once more for the setting up of another call.

Continuing the description of the system for the case in which each control unit 16, 17 and 18 is of the said first type: in the case of a call to one of the telephone stations 1 to 10 from the telephone exchange 12, a calling loop is applied across the positive and negative terminals, and earth is connected to the P wire terminal of the particular exchange outlet associated with the wanted telephone station. Let it be assumed that a calling loop is applied across the positive and negative terminals 81 and 82 and earth potential is applied to the P wire terminal 83 of the exchange outlet associated with the telephone station 9. Winding 50 is energised and relay 9COA operates. Contacts 9COA1 complete a circuit to energise winding 49 of relay 9COB and contacts 9COA2 connect earth potential to mark the eleventh contact in the bank associated with the wiper SW5. Contacts 9COA3 (FIGURE 9) complete a circuit to operate the relay ST in the portion 84 of the guard equipment (FIGURE 9) and the relays CAA and CAB which act to apply earth potential to all ten outlets associated with the telephone stations 1 to 10.

Upon the relay 9COB operating, its contacts 9COB1 switch the P wire terminal 83 from the earth associated with the contacts CAB4 to the earth associated with the contacts 9COA1. Contacts 9COB2 complete a holding circuit for the relay 9COA and connect earth potential to the eleventh contact in the bank associated with the wiper SW3.

Upon the relay ST operating, its contacts ST1 complete a circuit to energise winding 36 of relay OC, this circuit being by way of the contacts H7, ICB2 and ST1, the wiper SW8 and the contacts H4. The relay OC thus operates and at contacts OC1 completes an energising circuit whereby the relay STA is operated. Contacts OC2 prepare for the subsequent operation of the relay CG. Contacts OC3 open to prevent the subsequent operation of the relay HA. Contacts OC4 open to prevent the subsequent application of a loop across the terminals 74 and 75. Contacts OC5 open to prevent the subsequent operation of the relay ICA and contacts OC6 prepare for the subsequent operation of the relay A.

The operation of the relay STA results at the contacts STA1 in the completion of a holding circuit for the relays OC and STA and in the connection of earth potential to the lead 63. The contacts STA2 connect earth potential to the start lead 64 so that the relay B operates to start the impulse generator. The contacts STA4 prepare an energising circuit for the relay CD and the switch SW. The contacts STA6 connect the wiper SW5 to the winding 53 of the relay HX and the contacts STA3 and STA5 have no function at this stage.

The electric impulse generator (FIGURE 6) acts in the manner previously described both to supply 100 volt impulses to the telephone line 13 and to bring about the stepping of the wipers SW1 to SW8 substantially in synchronism with the sequential actuation of the sets of contacts 1SA1 to 1SA4 and the like associated with the switch SA in the associated line unit (FIGURE 2). In stepping to its second bank contact, the wiper SW8 completes an energising circuit for the winding 41 of the relay CG which operates and at contacts CG1 completes a holding circuit for the relays CAA and CAB.

Stepping of the wipers SW1 to SW8 continues until they become positioned on the eleventh contacts in their banks. At this time, the set of contacts 9SA1 to 9SA4 in the line unit (FIGURE 2) are actuated and the telephone line 13 is extended to the wanted telephone station 9.

Owing to the marking earth on the eleventh contact of the bank associated with the wiper SW5, the relay HX operates and at the contacts HX1 completes an energising circuit for the winding 52 of the relay H. The contacts HX2 open to prevent further operation of the impulse generator.

Upon the operation of the relay H, the contacts H1 disconnect the energising circuit of the windings 58 and 60 of the relays CAA and CAB. The contacts H2 and H3 extend the line-wires 13a and 13b to the negative and positive terminals 82 and 81 whereupon the final selector (not shown) over which the call has been extended to those terminals acts to supply ringing current to the wanted telephone station 9. The contacts H4 disconnect earth potential from the start lead 64 and from the wiper SW8 and connect earth potential to the winding 40 of the relay CG. The contacts H5 complete a holding circuit for the windings 51 and 53 of the relays H and HX by way of the wiper SW3. The contacts H6 disconnect the energising circuit of the relay CR. The contacts H7 disconnect the energising circuit of the relay OC which releases whereupon tht contacts OC1 disconnect the energising circuit of the relay STA. The contacts H8 connect earth potential to the winding 50 and so cause the relay 9COA to release.

Upon the relay 9COA releasing, the contacts 9COA1 open but the relay 9COB holds operated to the earth potential which is applied to the P wire terminal 83 during the continuation of the call. The contacts 9COA2 have no function at this stage and the contacts 9COA3 disconnect the energising circuits of the relays CAA, CAB and ST.

The release of the relay CR puts the relays CAA and CAB under the control of the control units 17 and 18. The release of the relays CAA and CAB causes the earth potential to be disconnected from the P wire terminals (not shown) of the outlets associated with the telephone stations 1 to 8 and 10. The contacts ST1 and STA1 to STA6 have no function upon the release of the relays ST and STA.

The bell (not shown) at the telephone station 9 is rung by the supply of ringing current from the exchange 12, this current supply being tripped upon the called subscriber answering the call. During the call, the relays 9COB, CG, HX and H hold operated.

Upon the release of the final selector engaged in connection with the call at the end of the call, the earth potential is disconnected from the P wire terminal 83 and the relay 9COB releases. The contacts 9COB1 prepare a release guard circuit for the terminal 83 and the contacts 9COB2 disconnect the energising circuit of the relay HX which releases.

The subsequent operations are similar to those described in connection with the release of the call originated from the telephone station 1. Thus the relay H releases due to the opening of the contacts HX1. The contacts H4 then connect earth potential to the wiper SW8 so that the impulse generator is started and the contacts H1 close to cause the operation of the relays CAA and CAB with the consequent application of earth potential to the P wire terminals 83 and the like of the outlets associated with the telephone stations 1 to 10. The contacts of the switch SA in the line unit (FIGURE 2) and the wipers SW1 to SW8 of the uniselector switch SW are operated to their home positions whereupon the relay CG releases to cause the release of the relays CAA and CAB and the operation of the relay CR. The control unit 16 is then available for use in setting up a further call between any one of the telephone stations 1 to 10 and the telephone exchange 12.

The circuit of the control unit 16 of the said second type, which is shown in FIGURES 5A, 6, 7A, 8A and 9A when arranged in accordance with FIGURE 11A, differs only slightly from the circuit of the control unit 16 of the said first type described above. Thus the switch SW has three extra wipers SW9, SW10 and SW11 and associated contact banks to enable the selection of any one of ten subscriber's uniselector circuits of the telephone exchange 12 that are connected to the third to twelfth contacts of those contact banks. In this manner it is arranged that each of the telephone stations 1 to 10 is associated with a different one of those ten uniselector circuits. The winding 51 (FIGURE 8) of the relay H is dispensed with and this relay H is provided with a relief relay HB having contacts HB1 in FIGURE 9A which replace the contacts H6 in FIGURE 9, contacts HB2 which replace the contacts H7 in FIGURE 5 and contacts HB3 in FIGURE 7A which replace the contacts OC4 in FIGURE 7. The circuit in FIGURE 7 which comprises the contacts ICB3, CD3 and OC4 and which is connected across the terminals 74 and 75 is replaced in FIGURE 7A by a circuit which comprises the contacts ICB3 and HB3 and which is connected across the contacts HA3 and HA4, the contacts CD3 fulfilling a new function and appearing in FIGURE 8A.

The manner of operation of this second type of control unit 16 is generally the same as has been described above in respect of the control unit of the said first type so that only those features which have no precedent will be described in detail. Thus in response to a calling loop originated at one of the telephone stations 1 to 10, such as the telephone station 1, the relay IC (FIGURE 7A) operates. The relay ICA (FIGURE 5A) then operates due to the closing of the contacts IC1 whereafter the relay ICB operates due to the closing of the contacts ICA1. Contacts ICB4 (FIGURE 9A) close and result in the operation of the relays ST, CAA and CAB so that earth potential is applied to the P wire terminals 83 and the like of each of the outlets in the final selector multiple (not shown) that are associated with the telephone stations 1 to 10.

The operation of the relay ST results in the operation of the relays STA and CG and the impulse generator (FIGURE 6) commences operation due to the connection of earth potential to the start lead 64 by the contacts STA2. 100 volt impulses are supplied to the telephone line 13 so that the switch SA in the line unit (FIGURE 2) at the distant end of that line operates and the uniselector switch SW steps its wipers SW1 to SW11. The stepping of the wipers SW1 to SW11 from the home contact in their contact banks results in the release of the relay IC followed by the release of the relay ICA.

As the result of the second 100 volt impulse supplied to the telephone line, the switch SA (FIGURE 2) closes the contacts 1SA1 and 1SA3 to re-apply the calling loop originated at the telephone station 1 to the telephone line 13. The relay IC therefore reoperates whereupon its contacts IC2 open to prevent further operation of the impulse generator and its contacts IC3 close to cause the operation of the relay HA. The relay ICA re-operates also due to the closing of the contacts IC1. At this time, the wipers SW1 to SW11 are positioned on the third contacts in their contact banks. Thus the subscriber's uniselector circuit (not shown) which is associated with the telephone station 1 and which is connected to the terminals 88, 89 and 90 is selected by the wipers SW10, SW9 and SW11 respectively. The meter (not shown) which is for recording calls originated at the telephone station 1 and which is connected in a circuit between the terminals 77 and 91 is selected by the wiper SW7.

The slow-release relay CD is operated at this time but the energising circuit of its winding 38 is disconnected at the contacts AA1 of the relay AA in the impulse generator. It is arranged that the relay CD does not release for an interval of time after the relay HA operates. During this interval, the relay HX operates due to the closing of the contacts HA2. The closing of contacts HA3 and HA4 connects a loop circuit comprising the contacts ICB3 and HB3 across the terminals 88 and 89. The subscriber's uniselector circuit (not shown) connected to these terminals 88 and 89 responds to connect those terminals to the positive and negative line terminals of an available first group selector in the telephone exchange 12 and to connect earth potential to the terminal 90. Because of this earth potential, the relay HX does not release upon the release of the relay CD. The contacts HX1 close to complete a circuit for energising the winding 52 of the relay H which therefore operates and through its contacts H6 causes the relief relay HB to operate. The contacts H2 and H3 extend the telephone line 13 through to the then engaged first group selector of the exchange 12 and cause the relay IC to release. The contacts HB1 disconnect the energising circuit for the winding 56 of the slow-release relay CR which releases after a short delay and the contacts HB3 disconnect the loop circuit whereby the first group selector was engaged.

The release of the relay IC is followed by the release of the relays ICA and ICB which latter relay ICB in turn causes the relays ST, STA, CAA and CAB to release. Contacts CAA1 (not shown) complete a circuit between the terminal 90 which is at earth potential and the P wire terminal (not shown) of the particular exchange outlet that is associated with the telephone station 1. The contacts CAA2 to CAA5 and CAB1 to CAB5 disconnect earth potential from the P wire terminals of the other nine exchange outlets.

The operations of this second type of control unit which occur upon the termination of the call set up from the telephone station 1 and upon the setting up and release of a connection to one of the terminal stations 1 to 10 from the associated outlet in the final selector multiple differ so slightly from the corresponding operations of the first type of control unit that are described above that they may be readily followed from that description. It should be borne in mind that the terminal 76 of FIGURE 8 corresponds to the wiper SW11, its associated contact bank and the terminals 90 and the like in FIGURE 8A and that there are other minor differences between the circuits of the two types of control unit which differences have been referred to previously.

It may so happen during the setting up of a connection from one of the telephone stations 1 to 10 to the telephone exchange 12 that the switch SA, SB or SC as the case may be, connects the associated telephone lines 13, 14 or 15 to a telephone station 1 to 10 that is already engaged in connection with another call. Clearly the control units 16, 17 and 18 must be capable of distinguishing between a calling loop due to an existing connection and the calling loop originated from the telephone station that is to be connected thereby to the telephone exchange 12 in order that there shall be no interference with the established call. The two types of control unit described above distinguish between such calling loops and act to prevent interference with an established call in the same manner which may be best understood by considering a particular example. Thus, let it be assumed that a call is in progress between the telephone station 9 and the telephone exchange 12 over the telephone line 14, the control units 16, 17 and 18 being of the said first type. In the control unit 17, the wipers corresponding to the wipers SW1 to SW8 are positioned on the eleventh contacts of their associated banks and the relay corresponding to the relay H is operated. Contacts of this relay that correspond to the contacts H8 are closed so that earth potential is applied over the wiper corresponding to the wiper SW4 to the eleventh contact of the associated bank which contact is connected to the eleventh contact of the corresponding banks in the control units 16 and 18. The tenth contact of the bank associated with the wiper SW6 is therefore at earth potential since it is connected to the eleventh contact of the bank associated with the wiper SW4.

If the call has been set up to the telephone station 9, then the relay 9COB is operated but this is of no consequence. The relay 9COA is not operated since earth potential is applied to both sides of its winding 50 and to the P wire terminal 83 irrespective of whether the call was set up to or from the telephone station 9.

If now the control unit 16 becomes available whereafter a calling loop is originated at the telephone station 10, the control unit 16 responds in the manner previously described so that 100 volt impulses are supplied to the telephone line 13 and the switch SW steps its wipers SW1 to SW8. Upon the relay AA releasing after the termination of the ninth impulse, the two-wire line of the telephone station 8 is connected to the telephone line 13 by the switch SA (FIGURE 2) and the switch SW steps its wipers SW1 to SW8 onto the tenth contacts in their banks. The wiper SW6 engages earth potential so that when the relay A operates at the commencement of the tenth impulse, the contacts A7 complete an energising circuit for the winding 54 of relay SO which is slow to release. When the relay SO operates, its contacts SO1 and SO2 open and so prevent the operation of the relay IC when the calling loop due to the existing connection is applied to the telephone line 13 upon the switch SA (FIGURE 2) operating in response to the tenth impulse.

The energising circuit of the winding 54 is disconnected when the wipers SW1 to SW8 are stepped to the eleventh contacts of their banks but the relay SO does not release until after the relay A has operated at the commencement of the eleventh impulse and the contacts A4 and A5 have switched to further disconnect the energising circuit of the relay IC. The contacts SO1 and SO2 close upon the release of the relay SO and the relay IC is able to operate when the contacts A4, A5 and AA2 restore at the termination of the eleventh impulse. The short interval of time which may elapse between the release of the relay AA after the eleventh impulse and the operation of the switch SA is not sufficient to enable the relay IC to operate in response to the calling loop due to the existing connection.

I claim:

1. In an automatic system, a plurality of two-wire telephone lines, a plurality of outlets and a plurality of line circuits of an automatic telephone exchange, a plurality of control circuits which are connected on one side to said outlets and to said line circuits and which are each connected on the other side to one end of a different one of said telephone lines, a plurality of switching means each connected to the other end of a different one of said telephone lines and a plurality of local two-wire lines which are each associated with a different one of said outlets and which are connected to said switching means; each said switching means having a normal condition in which it provides connections between its telephone line and all said local lines whereby a calling condition then occurring on any local line is applied to its telephone line and a plurality of off-normal conditions in each of which it provides a connection between a different one of said local lines and its telephone line, each said control circuit comprising further switching means having a plurality of off-normal conditions in each of which it selects a different one of said outlets and a normal condition, impulse generating means which is connected to said further switching means and to the associated telephone line and which is for operating said further switching means and for supplying electric impulses to that telephone line so that said further switching means and the first named switching means that is connected to the other end of that telephone line operate in synchronism to select associated ones of said local lines and said outlets, calling means which is connected to the associated telephone line, to said impulse generating means and to said further switching means and which is for initiating operation of said further impulse generating means upon the application of a calling condition to that telephone line when said further switching means is in its normal condition, connecting means which is connected both between the associated telephone line and said line circuits and to said impulse generating means and which, when operated, both provides a connection between that telephone line and one of said line circuits and inhibits operation of said impulse generating means, first circuit means connecting in circuit said further switching means, said connecting means and said calling means so that the operation of said connecting means is effected upon the response of said calling means to a calling condition at any off-normal condition of said further switching means and the release of said connecting means is effected upon the termination of that calling condition and second circuit means connecting in circuit said further switching means, said connecting means and said impulse generating means so that, upon the release of said connecting means, operation of said impulse generating means is effected until said further switching means and the associated first named switching means connected to the other end of the associated telephone line both attain their normal condition, and there being third circuit means which connects in circuit all said calling means so that only one of those calling means can respond to a calling condition.

2. An automatic telephone system according to claim 1 wherein the number of said line circuits is equal to the number of said control circuits and wherein each control circuit is connected to a different one of said line circuits.

3. An automatic telephone system according to claim 1 wherein the number of said line circuits is equal to the number of the local lines and wherein said further switching means of each control circuit is adapted to select a different one of said line circuits at each off-normal condition thereof.

4. An automatic telephone system according to claim 1 wherein said impulse generating means is common to all said control circuits.

5. An automatic telephone system according to claim 1 wherein each of the first named switching means to which said local two-wire lines are connected has a plurality of sets of electric contacts which are arranged for actuation by cam members and of which one set of contacts provides connections between the associated telephone line and all said local lines when that switching means is in its normal condition and the remaining sets of contacts provide connections between the associated telephone line and a different one of said local lines for each off-normal condition of that switching means.

6. In an automatic telephone system, a two-wire telephone line, a plurality of outlets and at least one line circuit of an automatic telephone exchange, a control circuit connected on one side to said outlets and to said line circuit and on the other side to one end of said telephone line, switching means connected to the other end of that line and a plurality of local two-wire lines which are each associated with a different one of said outlets and which are connected to said switching means; said switching means having a plurality of sets of electric contacts which are arranged for actuation by cam members and of which one set of contacts provides connections between said telephone line and all said local lines, only in a predetermined normal condition of that switching means, whereby a calling condition then occurring on any local line is applied to said telephone line, and the remaining sets of contacts provide connections between said telephone line and a different one of said local lines for each of a plurality of off-normal conditions of that switching means, and said control circuit comprising further switching means having a plurality of off-normal conditions in each of which it selects a different one of said outlets and a normal condition, impulse generating means which is connected to said further switching means and to said telephone line and which is for operating said further switching means and for supplying electric impulses to said telephone line so that the first-named switching means and said further switching means operate in synchronism to select associated ones of said local lines and said outlets, calling means which is connected to said telephone line, to said impulse generating means and to said further switching means and which is for initiating operation of said impulse generating means upon the application of a calling condition to said telephone line when said further switching means is in its normal condition, connecting means which is connected both between said telephone line and said line circuit and to said impulse generating means and which, when operated, both provides a connection between said telephone line and said line circuit and inhibits operation of said impulse generating means, first circuit means connecting in circuit said further switching means, said connecting means and said calling means so that the operation of said connecting means is effected upon the response of said calling means to a calling condition at any off-normal condition of said further switching means and the release of said connecting means is effected upon the termination of that calling condition, and second circuit means connecting in circuit said further switching means, said connecting means and said impulse generating means so that, upon the release of said connecting means, operation of said impulse generating means is effected until the first-named switching means and said further switching means both attain their normal condition.

References Cited in the file of this patent

UNITED STATES PATENTS

| | | |
|---|---|---|
| 2,057,868 | Wochinger | Oct. 20, 1936 |
| 2,542,079 | Grundin et al. | Feb. 20, 1951 |
| 2,783,306 | Lesigne | Feb. 26, 1957 |
| 2,787,667 | Mauge et al. | Apr. 2, 1957 |
| 2,837,602 | Lundkvist | June 3, 1958 |
| 2,863,950 | Dunning et al. | Dec. 9, 1958 |
| 2,884,490 | Trachel | Apr. 28, 1959 |